(12) United States Patent
Jeon

(10) Patent No.: US 8,082,950 B2
(45) Date of Patent: Dec. 27, 2011

(54) TUBE CONNECTOR

(75) Inventor: Jin Hwan Jeon, Ulsan (KR)

(73) Assignee: Hyundai Motor Company, Seoul (KR)

( * ) Notice: Subject to any disclaimer, the term of this patent is extended or adjusted under 35 U.S.C. 154(b) by 458 days.

(21) Appl. No.: 12/272,140

(22) Filed: Nov. 17, 2008

(65) Prior Publication Data

US 2009/0278349 A1 Nov. 12, 2009

(30) Foreign Application Priority Data

May 6, 2008 (KR) .................. 10-2008-0041988

(51) Int. Cl.
*F16K 1/30* (2006.01)
(52) U.S. Cl. ................. 137/614.2; 251/149.6; 251/149.1
(58) Field of Classification Search .................... 251/82, 251/83, 149.1, 149.3, 149.6, 149.7; 137/517, 137/518, 519, 520, 521, 614.2
See application file for complete search history.

(56) References Cited

U.S. PATENT DOCUMENTS

| | | | | |
|---|---|---|---|---|
| 3,095,899 A | * | 7/1963 | Billington | 137/454.5 |
| 5,107,891 A | * | 4/1992 | Abe | 137/557 |
| 6,283,443 B1 | * | 9/2001 | Taneya | 251/149.6 |
| 6,834,666 B2 | * | 12/2004 | Murayama et al. | 137/269 |
| 7,293,758 B2 | * | 11/2007 | Hsueh-Feng | 251/149.7 |

FOREIGN PATENT DOCUMENTS

| | | |
|---|---|---|
| JP | 11-230392 A | 8/1999 |
| KR | 10-1999-0062382 | 7/1999 |
| KR | 10-2004-0049011 | 6/2004 |
| KR | 10-2005-0097955 | 10/2005 |

* cited by examiner

*Primary Examiner* — John Fristoe, Jr.
(74) *Attorney, Agent, or Firm* — Edwards Wildman Palmer LLP; Peter F. Corless

(57) ABSTRACT

A tube connector for connecting a fluid supplying device to a tube for supplying the fluid from the fluid supplying device to the tube is provided, which comprises: a connector body comprising a penetration hole that is formed therein, a mounting portion for connecting the fluid supplying device thereto, and a tube connecting portion for connecting the tube thereto; a connecting unit disposed within the penetration hole for connecting the tube to the connector body; a valve unit disposed inside the penetration hole for controlling inflow of the fluid supplied from the fluid supplying device; a spacer having one end that contacts the tube inserted into the penetration hole within the penetration hole so as to operate the valve unit, and the other end that forms a passage between the other end and the valve unit; and a pressure control unit that is disposed between the valve unit and the spacer for controlling flow from the fluid supplying device in a predetermined pressure range.

8 Claims, 2 Drawing Sheets

TUBE CONNECTOR

CROSS-REFERENCE TO RELATED APPLICATION

This application claims priority to and the benefit of Korean Patent Application No. 10-2008-0041988 filed in the Korean Intellectual Property Office on May 6, 2008, the entire contents of which are incorporated herein by reference.

BACKGROUND (a) Technical Field

The present invention relates to a tube connector. More particularly, the present invention relates to a tube connector that can open or block fluid flow according to connection of a tube with a fluid supplying device, and controls fluid flow according to pressure of the fluid supplied from the fluid supplying device.

(b) Related Art

A tube connector connects a tube to a fluid supplying device, such as a compressor, a hydraulic pressure motor, and so on for supplying the fluid from the device to the tube.

For a conventional tube connector, a valve is provided within the tube connector and fluid flow from a fluid supplying device to a tube is controlled according to whether the tube connector is connected to the tube.

That is, when the tube connector is not connected with the tube, the valve closes the tube connector so that the fluid supplied from the fluid supplying device is sustained.

On the other hand, when the tube connector is connected with the tube, the valve opens the tube connector so that the fluid supplied from the fluid supplying device is supplied.

The conventional tube connector, however, may not control fluid flow according to pressure of the fluid; high pressure of the fluid may damage the tube.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a tube connector having advantages of controlling fluid supply to a tube according to pressure of the fluid as well as according to connection of the tube and the tube connector.

A tube connector, which connects a fluid supplying device to a tube for supplying fluid from the fluid supplying device to the tube, according to an exemplary embodiment of the present invention may include: a connector body including a penetration hole that is formed therein; a mounting portion for connecting the fluid supplying device thereto and a tube connecting portion for connecting the tube thereto; a connecting unit disposed within the penetration hole for connecting the tube to the connector body; a valve unit disposed inside the penetration hole for controlling inflow of the fluid supplied from the fluid supplying device; a spacer having one end that contacts the tube inserted into the penetration hole within the penetration hole so as to operate the valve unit, and the other end that forms a passage between the other end and the valve unit; and a pressure control unit that is disposed between the valve unit and the spacer for controlling flow from the fluid supplying device in a predetermined pressure range.

A screw thread may be formed to an exterior circumference of the mounting portion in order for the connector body to be connected with the fluid supplying device, and an end protrusion may be formed inwardly near an end of the mounting portion in order for the valve unit not to be separated from the connector body.

The valve unit may include: a valve movably disposed within the penetration hole, having first and second mounting holes formed to both ends thereof respectively, and having a plurality of fluid exhaust holes formed between the first and second mounting holes while being connected with the first mounting hole; a valve spot that is disposed corresponding to the position of the fluid exhaust holes in order for the fluid inflowing to the penetration hole not to be exhausted when the tube is not connected with the connector body; and a valve spring disposed between the first mounting hole and the end protrusion.

The pressure control unit may include a pressure control spring disposed between the second mounting hole and the spacer.

An elastic coefficient of the pressure control spring may be higher than that of the valve spring.

The connecting unit may include: a collar inserted into the penetration hole from the tube connecting portion; a sleeve that is movably disposed within the collar, a part of which is protruded outward from the tube connecting portion in order for the tube to be inserted into the penetration hole; a stopper that is disposed near the collar within the penetration hole; and a tube sealing that is disposed near the stopper for sealing a space between the penetration hole and the tube inserted into the penetration hole.

A sleeve protrusion may be formed to an exterior circumference of the sleeve in order for the sleeve not to be separated from the collar and a collar protrusion may be formed to an interior circumference of the collar for hooking the sleeve protrusion.

A tube locking ring may be disposed between the collar and the stopper in order for the tube inserted through the sleeve not to be separated from the penetration hole.

A stopper protrusion may be formed to an interior circumference of the stopper for the spacer not to be separated from the stopper.

The tube connector according to an exemplary embodiment of the present invention may include a valve unit and a pressure control unit so that the tube connector may control fluid supply to a tube according to pressure of the fluid as well as according to connection of the tube and the tube connector, thereby being able to prevent damage of the tube due to high pressure fluid.

Figure 1:
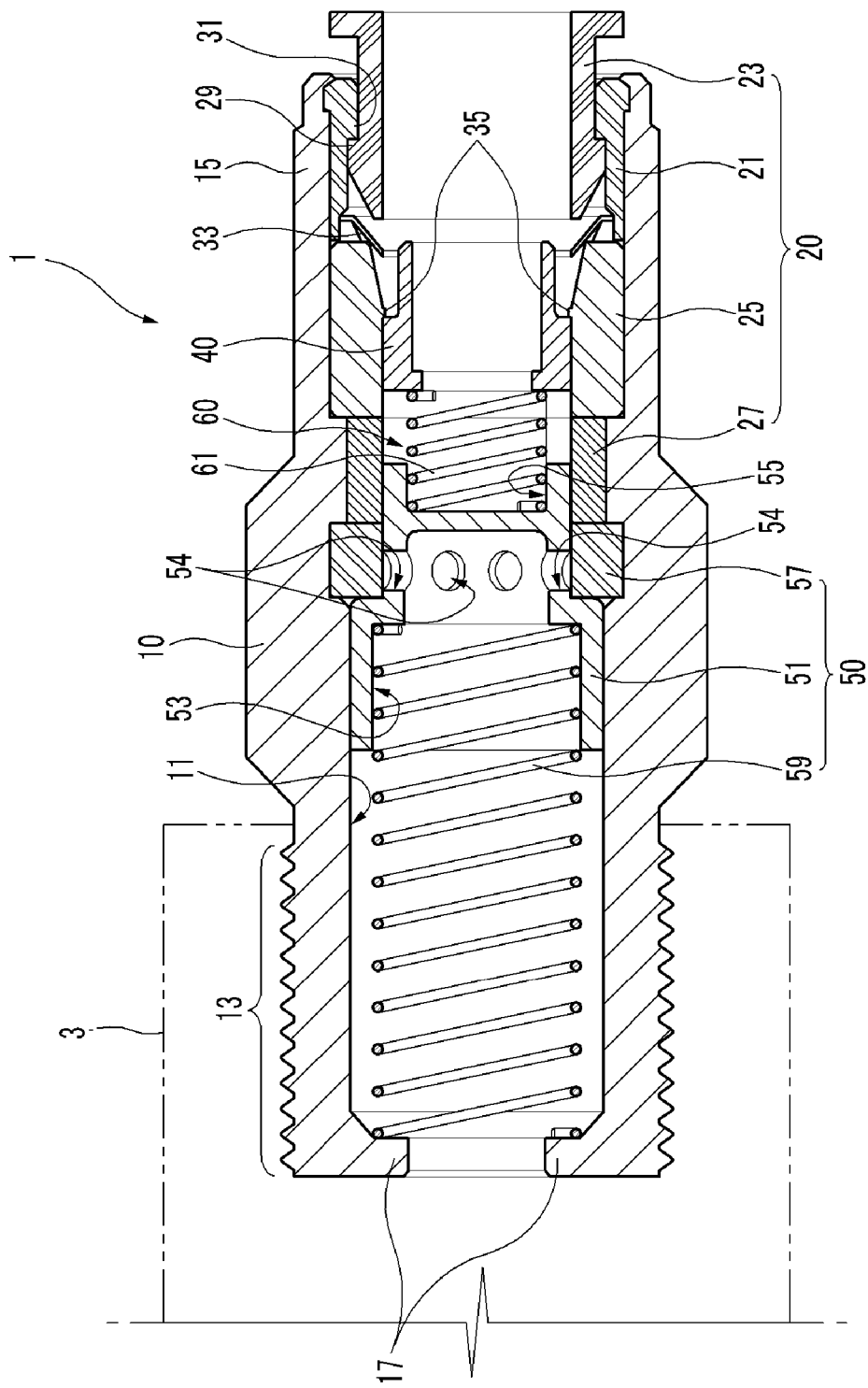
FIG. 1 is a cross-sectional view of a tube connector according to an exemplary embodiment of the present invention.

Reference numerals set forth in the Drawings includes reference to the following elements as further discussed below:

1: tube connector
3: fluid supplying device
5: tube
10: connector body
11: penetration hole
13: mounting portion
15: tube connecting portion 17: end protrusion
20: connecting unit
21: collar
23: sleeve
25: stopper
27: tube sealing
29: sleeve protrusion
31: collar protrusion
33: tube locking ring
35: stopper protrusion
40: spacer
50: valve unit
51: valve
53: first mounting hole
54: exhaust hole
55: second mounting hole
57: valve spot
58: passage
59: valve spring
60: pressure control unit
61: pressure control spring

DETAILED DESCRIPTION OF THE EMBODIMENTS

An exemplary embodiment of the present invention will hereinafter be described in detail with reference to the accompanying drawings.

The scheme described in the specification is an exemplary embodiment of the present invention and it is to be understood that the invention is not limited to the disclosed embodiment, but, on the contrary, is intended to cover various modifications and equivalent arrangements included within the spirit and scope of the appended claims.

Figure 2:
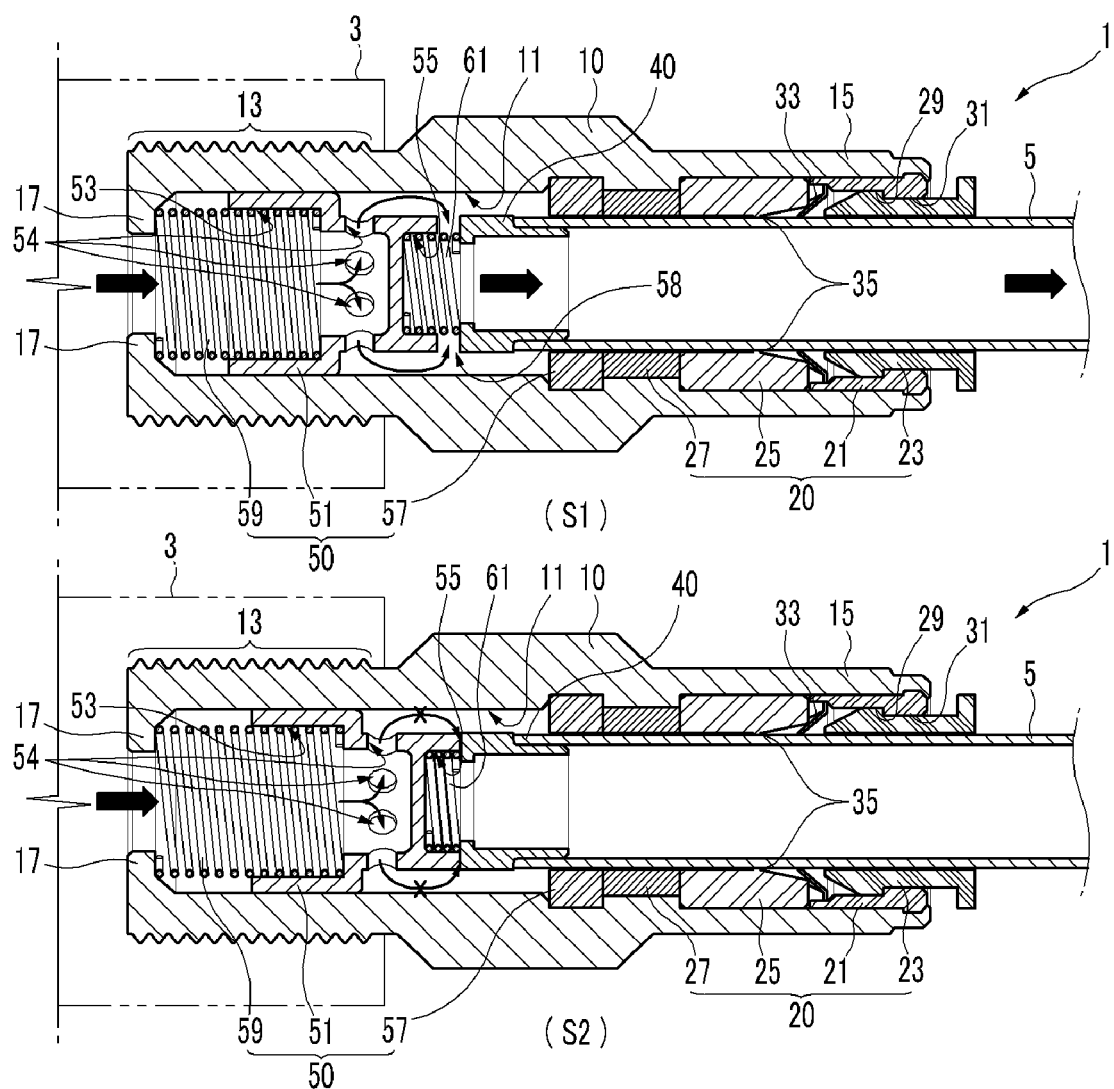
FIG. 2 shows operational states of the tube connector according to an exemplary embodiment of the present invention.

FIG. 1 is a cross-sectional view of a tube connector according to an exemplary embodiment of the present invention, and FIG. 2 shows operational states of the tube connector of FIG. 1.

A tube connector 1 according to an exemplary embodiment of the present invention is connected with a tube 5 and a fluid supplying device 3 supplying fluid, and controls the fluid supply to the tube 5 according to pressure of the fluid as well as according to connection of the tube 5 and the tube connector 1.

The tube connector 1, as shown in FIG. 1 and FIG. 2, includes a connector body 10, a connecting unit 20, a spacer 40, a valve unit 50, and a pressure control unit 60.

The connector body 10 is provided with a penetration hole 11 therein. The connector body 10 includes a mounting portion 13 for connecting the fluid supplying device 3 and a tube connecting portion 15 for connecting the tube 5.

A screw thread is formed to an exterior circumference of the mounting portion 13 in order for the connector body 10 to be connected with the fluid supplying device 3, and an end protrusion 17 is formed inwardly near an end of the mounting portion 13 in order for the valve unit 50 not to be separated from the connector body 10.

The connector body 10 is connected with the fluid supplying device 3 and the fluid supplied from the fluid supplying device 3 is supplied to the penetration hole 11.

The connecting unit 20 for connecting the tube 5 is inserted into the penetration hole 11 from the tube connecting portion 15.

The connecting unit 20 includes a collar 21, a sleeve 23, a stopper 25, and a tube sealing 27.

The collar 21 is inserted into the penetration hole 11 from the tube connecting portion 15.

The sleeve 23 is movably disposed within the collar 21.

A part of the sleeve 23 is protruded outward from the tube connecting portion 15 in order for the tube 5 to be inserted into the penetration hole 11.

A sleeve protrusion 29 is formed to an exterior circumference of the sleeve 23 in order for the sleeve 23 not to be separated from the collar 21 and a collar protrusion 31 is formed to an interior circumference of the collar 21 for hooking the sleeve protrusion 29.

The stopper 25 is disposed near the collar 21 within the penetration hole 11.

A tube sealing 27 is disposed near the stopper 25 for sealing a gap between the penetration hole 11 and the tube 5 inserted into the penetration hole 11.

A tube locking ring 33 is disposed between the collar 21 and the stopper 25 in order for the tube 5 inserted through the sleeve 23 not to be separated from the penetration hole 11.

The spacer 40 has one end that contacts the tube 5 inserted into the penetration hole 11 within the penetration hole 11 so as to operate the valve unit 50, and the other end that forms a passage 58 between the other end of the spacer 40 and the valve unit 50.

A stopper protrusion 35 is formed to an interior circumference for the spacer 40 not to be separated from the stopper 25.

The valve unit 50 is disposed inside the penetration hole 11 by being inserted from the mounting portion 13 for controlling inflow of the fluid supplied from the fluid supplying device 3.

The valve unit 50 includes a valve 51, a valve spot 57, and a valve spring 59.

The valve 51 is movably disposed within the penetration hole 11.

First mounting hole 53 is formed to one end of the valve 51 and second mounting hole 55 is formed the other end of the valve 51. A plurality of fluid exhaust holes 54 connected with the first mounting hole 53 are formed between the first and second mounting holes 53 and 54.

The valve spot 57 is disposed corresponding to the position of the fluid exhaust holes 54 in order for the fluid inflowing to the penetration hole 11 not to be exhausted when the tube 5 is not connected with the connector body 10.

The valve spring 59 is disposed between the first mounting hole 53 and the end protrusion 17.

It is preferable that the valve spring 59 is a coil spring with one end thereof supported by the first mounting hole 53 and the other end supported by the end protrusion 17.

The pressure control unit 60 is disposed between the valve unit 50 and the spacer 40, and prevents the fluid from inflowing into the penetration hole 11 with a pressure higher than a predetermined pressure.

The pressure control unit 60 includes a pressure control spring 61 that is disposed between the second mounting hole 55 of the valve 51 and the spacer 40.

It is preferable that the pressure control spring 61 is a coil spring with one end thereof supported by the second mounting hole 55 and the other end supported by the spacer 40.

Suitably, the valve spring 59 and the pressure control spring 61 have different elastic coefficients The elastic coefficient of the pressure control spring 61 may be higher than that of the valve spring 59.

Hereinafter, operation of the above-described tube connector 1 will be explained with reference to FIGS. 1 and 2.

As shown in FIG. 1, when the tube connector 1 is not connected with the tube 5, the exhaust hole 54 is blocked by the valve spot 57 so that the fluid from the fluid supplying device 3 is not supplied.

With reference to FIG. 2, the tube connector 1 is to be connected with the fluid supplying device 3 through the mounting portion 13 and the tube 5 for exhausting the fluid supplied from the fluid supplying device 3 is to be inserted into the penetration hole 11 via the sleeve 23.

The tube 5, as shown in S1 of FIG. 2, pushes the spacer 40 and the pressure control spring 61, and the valve 51 is thereby moved toward the mounting portion 13 in the penetration hole 11 so that the fluid exhaust holes 54 are moved from the valve spot 57 and opened.

The valve spring 59 and the pressure control spring 61 are simultaneously compressed, but the pressure control spring 61 is less compressed than the valve spring 59 because the elastic coefficient of the pressure control spring 61 is higher than that of the valve spring 59.

When the tube 5 is inserted, a passage 58 is formed between the spacer 40 and the valve 51 due to the relatively less compressed pressure control spring 61.

That is, when the pressure of the fluid supplied from the fluid supplying device 3 is equal to or lower than a predetermined pressure, the fluid flows though the passage 58 between the spacer 40 and the valve due to the restoring force of the pressure control spring 61.

The fluid supplied from the fluid supplying device 3 is supplied to the tube 5 via the penetration hole 11, the fluid exhaust holes 54 and the passage 58 between the valve 51 and the spacer 40.

On the other hand, if the pressure of the fluid supplied from the fluid supplying device 3 is higher than the predetermined pressure, as shown in S2 of FIG. 2, the pressure control spring 61 is compressed and the valve 51 is moved toward the spacer 40.

That is, when the pressure of the fluid supplied from the fluid supplying device 3 is higher than the predetermined pressure (e.g., pressure generated by the restoring force of the pressure control spring 61, the valve 51 becomes in contact with the spacer 40, which causes the passage 58 to be closed so that the fluid having a pressure higher than the predetermined pressure can be controlled.

Thus, the tube connector 1 according to an exemplary embodiment of the present invention may control the valve 51 with the valve spring 59 and the pressure control spring 61 having different spring elastic coefficients so that the tube connector 1 may control fluid supply to the tube 5 according to pressure of the fluid as well as according to connection of the tube 5 and the tube connector 1.

Thus, the tube connector 1 may control fluid supply to a tube 5 according to pressure of the fluid and thus damage of the tube 5 may be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A tube connector for connecting a fluid supplying device to a tube for supplying the fluid from the fluid supplying device to the tube, comprising:
    a connector body comprising a penetration hole that is formed therein, a mounting portion for connecting the fluid supplying device thereto, and a tube connecting portion for connecting the tube thereto;
    a connecting unit disposed within the penetration hole for connecting the tube to the connector body;
    a valve unit disposed inside the penetration hole for controlling inflow of the fluid supplied from the fluid supplying device, the valve unit including a valve having a first mounting hole formed in one end of the valve and a second mounting hole formed in the other end of the valve;
    a spacer having one end that contacts the tube inserted into the penetration hole within the penetration hole so as to operate the valve unit, and the other end that forms a passage between the other end and the valve unit; and
    a pressure control unit that is disposed between the valve unit and the spacer for controlling flow from the fluid supplying device in a predetermined pressure range, wherein the pressure control unit includes a pressure control spring that is disposed between the second mounting hole of the valve and the spacer.

2. The tube connector of claim 1, wherein a screw thread is formed to an exterior circumference of the mounting portion in order for the connector body to be connected with the fluid supplying device, and an end protrusion is formed inwardly near an end of the mounting portion in order for the valve unit not to be separated from the connector body.

3. The tube connector of claim 2, wherein the valve unit comprises:
    the valve movably disposed within the penetration hole, and having a plurality of fluid exhaust holes formed between the first and second mounting holes while being connected with the first mounting hole;
    a valve spot that is disposed corresponding to the position of the fluid exhaust holes in order for the fluid inflowing to the penetration hole not to be exhausted when the tube is not connected with the connector body; and
    a valve spring disposed between the first mounting hole and the end protrusion.

4. The tube connector of claim 1, wherein the pressure control spring has an elastic coefficient higher than that of the valve spring.

5. The tube connector of claim 1, wherein the connecting unit comprises:
    a collar inserted into the penetration hole from the tube connecting portion;
    a sleeve movably disposed within the collar, a part of which is protruded outward from the tube connecting portion in order for the tube to be inserted into the penetration hole;
    a stopper that is disposed near the collar within the penetration hole; and
    a tube sealing that is disposed near the stopper for sealing a space between the penetration hole and the tube inserted into the penetration hole.

6. The tube connector of claim 5, wherein a sleeve protrusion is formed to an exterior circumference of the sleeve in order for the sleeve not to be separated from the collar and a collar protrusion is formed to an interior circumference of the collar for hooking the sleeve protrusion.

7. The tube connector of claim 5, wherein a tube locking ring is disposed between the collar and the stopper in order for the tube inserted through the sleeve not to be separated from the penetration hole.

8. The tube connector of claim 5, wherein a stopper protrusion is formed to an interior circumference for the spacer not to be separated from the stopper.

* * * * *